United States Patent [19]

Grigo et al.

[11] 4,423,186
[45] Dec. 27, 1983

[54] IMPACT RESISTANT POLYAMIDE MOULDING COMPOSITIONS

[75] Inventors: Ulrich Grigo, New Martinsville, W. Va.; Friedrich Fahnler; Rudolf Binsack, both of Krefeld, Fed. Rep. of Germany

[73] Assignee: Bayer Aktiengesellschaft, Leverkusen, Fed. Rep. of Germany

[21] Appl. No.: 449,174

[22] Filed: Dec. 13, 1982

[30] Foreign Application Priority Data

Dec. 24, 1981 [DE] Fed. Rep. of Germany ....... 3151441

[51] Int. Cl.³ .................. C08L 31/00; C08L 51/04; C08L 77/00
[52] U.S. Cl. ................................. 525/66; 525/179; 525/183; 525/190
[58] Field of Search ................. 525/66, 179, 183, 190

[56] References Cited

U.S. PATENT DOCUMENTS 4,221,879 9/1980 Humme et al. ................. 525/66
4,381,366 4/1983 Sanderson et al. .............. 525/66

FOREIGN PATENT DOCUMENTS 43491 1/1982 European Pat. Off. .
2454770 5/1976 Fed. Rep. of Germany ........ 525/66
2654346 6/1978 Fed. Rep. of Germany .
2941025 4/1981 Fed. Rep. of Germany .
3019233 11/1981 Fed. Rep. of Germany ........ 525/66

OTHER PUBLICATIONS

Patent Abstracts of Japan, vol. 4, No. 182, JP-A-55-123639, Dec. 16, 1980.
Patent Abstracts of Japan, vol. 1, No. 126, p. 3591C77, JP-A-52-104567, Dec. 27, 1977.

Primary Examiner—Allan Lieberman
Assistant Examiner—A. L. Carrillo
Attorney, Agent, or Firm—Connolly and Hutz

[57] ABSTRACT

Impact-resistant polyamide moulding compositions consisting of from 35 to 99% by weight of polyamides and from 1 to 65% by weight of partly cross-linked polymer mixtures, comprising from 5 to 80% by weight of copolymers of ethylene/(meth)acrylic acid (esters) or corresponding graft polymers and from 95 to 20% by weight of polybutadiene rubbers, and optionally conventional additives.

9 Claims, No Drawings

IMPACT RESISTANT POLYAMIDE MOULDING COMPOSITIONS

This invention relates to thermoplastic polyamide moulding compositions which have an extremely high notched impact strength, in particular in the cold, and a substantially improved alternate bending resistance, and are produced by intimately mixing thermoplastic polyamides with partly crosslinked polymer mixtures of polybutadiene rubbers and of ethylene copolymers or polyethylene graft copolymers or mixtures of ethylene copolymers and polyethylene graft copolymers.

The impact resistance of mouldings consisting of PA compositions depends considerably on the water content thereof. When dry, the mouldings are sensitive to impact stress. They only achieve their known, outstanding impact resistance by conditioning, i.e. after absorbing water. However, the conditioning of polyamides is a time-consuming procedure which lasts for several days, especially as the water must not be concentrated in surface layers, but must be regularly distributed in the complete moulding.

Thus, repeated attempts have been made to impart a strength to the polyamides, even while they are dry, by mixing with suitable substances, which strength they would otherwise only achieve by conditioning.

The strength of polyamide moulding compositions may be improved, for example by incorporating low molecular weight plasticisers. However, such plasticisers have the following disadvantages:

1. Some of the plasticisers evaporate owing to their mostly high vapour pressure under the conditions of incorporation into the polyamide.
2. The low molecular weight plasticisers tend to migrate.
3. They are ineffective at low temperatures.
4. An improvement in strength is associated with a considerable reduction in flexural resistance and E modulus.

It has also been attempted to improve the strength of polyamides by admixing polyethylene. However, standard polyethylene is incompatible with polyamides. Considerable exfoliation occurs in a bending test of test bodies produced from such mixtures.

According to German Auslegeschrift No. 1,694,802, the compatibility of polyamide and polyethylene may be improved by adding copolymers of ethylene and acrylic acid (derivatives). However, this compatibility is still unsatisfactory.

German Auslegeschrift No. 1,138,922 discloses improving the strength of polyamide moulding compositions by admixing copolymers of ethylene and vinyl acetate.

Numerous publications, for example U.S. Pat. No. 3,742,916, and German Patent Nos. 1,241,606, 1,544,706 and 1,669,702 describe an increase in the strength of polyamide moulding compositions by mixing with copolymers of ethylene and $\alpha,\beta$-unsaturated acids or derivatives thereof.

However, all these proposals for improving the impact resistance of polyamide moulding compositions have the disadvantage that the notched impact strength in the cold and the alternate bending resistance are barely improved.

In order to provide polyamides with a high notched impact strength, in particular in the cold, rubber-like components which have low freezing temperatures, for example polybutadiene rubber, have to be mixed with the polyamides. Thus, German Offenlegungsschrift Nos. 2,742,176 and 2,941,025 describe modified polyamides which are produced by mixing thermoplastic polyamides and partly cross-linked, spherical graft copolymers of polybutadiene (graft base) and, for example, (meth)acrylates and/or styrene/acrylonitrile mixtures (grafted monomers). The polyamides which are modified in this manner indeed have a high notched impact strength, but an unsatisfactory alternate bending resistance.

Non-cross-linked polybutadiene rubbers may only be worked into polyamides with difficulty. Products of this type exhibit inhomogeneities and only have a moderate strength level.

Surprisingly, it has now been found that a high notched impact strength, in particular in the cold, and a greatly improved alternate bending resistance are achieved by modifying polyamides using polyethylenes containing polar groups and cross-linked polybutadiene rubbers. Thus, the present invention provides thermoplastic polyamide moulding compositions consisting of the following:

I. from 35 to 99, preferably from 45 to 97% by weight of polyamides, and

II. from 1 to 65% preferably from 3 to 55% by weight of a partly cross-linked polymer mixture containing a gel portion of from 5 to 95% by weight and consisting of:
  (a) from 5 to 80% preferably from 20 to 70% by weight of a copolymer of ethylene/(meth)acrylic acid or (meth)acrylates of $C_1$-$C_8$ alcohols or mixtures thereof and/or a graft polymer of polyethylene or ethylene/vinyl acetate copolymer as the graft substrate and (meth)acrylic acid or (meth)acrylates of $C_1$-$C_8$ alcohols or mixtures thereof as monomers to be grafted on and
  (b) from 95 to 20% preferably from 30 to 80% by weight of polybutadiene rubbers having a Mooney viscosity ML 1+4 (100) of from 5 to 100 and containing a gel portion of <2% by weight, determined in boiling chlorobenzene, III. optionally conventional additives, and IV. optionally from 10 to 60% by weight, based on the total moulding composition, of fillers or reinforcing materials or mixtures thereof the total of I-III and of (a) and (b) in each case being 100% by weight.

According to the present invention, aliphatic polyamides having a relative viscosity of from 2.3 to 4.8, preferably from 2.7 to 4.3 (measured on a 1% by weight solution in m-cresol at 20° C.) are preferably suitable for the production of the moulding compositions. Polyamide-6 or polyamide-6,6, but also mixtures thereof and block- or copolymers of, for example caprolactam, adipic acid and hexamethylenediamine are most preferably used.

For the production of the partly cross-linked polymer mixtures II, polybutadiene rubbers are preferably used as the rubber component which have a gel portion of <2% by weight (determined by heating for ½ hour in boiling chlorobenzene) and which have a Mooney viscosity ML 1+4 (100° C.) of from 5 to 100. Products which have a Mooney viscosity ML 1+4 (100° C.) of from 20 to 60 are preferred.

In polybutadiene rubbers, the butadiene units may be joined together via 1,2- and 1,4 bonds. The proportion of 1,4 bonds should preferably amount to from 30 to 99.9%. Polybutadiene rubbers which have a 1,4 proportion of from 50 to 99.0% are particularly preferred.

The polybutadiene rubbers are produced by known processes. By varying the reaction conditions, almost any 1,4 proportion may be adjusted in the rubber. The polybutadiene rubbers which are used in the Examples are standard products.

Polyethylenes containing polar groups preferably carboxylic acid groups are used as another component for the partly cross-linked mixtures. Ethylene copolymers or polyethylene graft products are included.

The ethylene copolymers may be produced according to known processes by copolymerization of ethylene with $\alpha,\beta$-unsaturated acids or derivatives thereof. The ethylene copolymers used according to the present invention are preferably produced from 99 to 40% preferably 97 to 75% by weight of ethylene and from 1 to 60% preferably from 3 to 25% by weight of (meth)acrylic acid or esters thereof with $C_1$–$C_8$ alcohols or vinyl or mixtures thereof as monomers. The gel portion of the ethylene copolymers amounts to from 5 to 30% by weight (determined in boiling chlorobenzene). Products which have a comonomer proportion of from 3 to 25% by weight are preferably used.

The polyethylene graft products which are used according to the present invention may be produced by known processes (for example, described in JA 34-30945 and in German Offenlegungsschrift No. 2,454,770). Polyethylene graft polymers which are preferred are produced according to a process which is described in more detail in German Offenlegungsschrift No. 2,801,585. In this process, a so-called bulk graft polymerisation is carried out, according to which the melt of the polyethylenes or ethylene copolymers used as the graft substrate is brought into contact with oxygen or oxygen-containing gases for a maximum of 10 minutes under a pressure of from 1 to 150 bars and at a temperature of from 80° to 300° C., and immediately thereafter, the monomers to be grafted on are added in the absence of oxygen or oxygen-containing gas, under intensive mixing, and the residual monomers are removed after polymerisation.

The polyethylene graft products which are produced by this process contain polyethylene as the graft substrate, and contain as the grafted-on monomers preferably from 1 to 60% by weight of (meth)acrylic acid or esters of (meth)acrylic acid of $C_1$–$C_8$ preferably $C_1$–$C_4$ alcohols or vinyl acetate or mixtures thereof. The gel content of the polyethylene graft polymers should be from 2 to 20% by weight (determined in boiling chlorobenzene). Polyethylene graft polymers having from 3 to 25% by weight of monomers to be grafted on are preferred according to the present invention. The graft product contains grafted copolymers and non-grafted homopolymers.

The partly cross-linked polymer mixtures are produced by mixing the ethylene copolymers or polyethylene graft copolymers with the polybutadiene rubber in conventional mixing units, such as rollers, kneaders and single and multiple shaft extruders at a mass temperature of from 150° to 250° C. Internal kneaders are particularly suitable.

A partial cross-linking occurs during the mixing process, which cross-linking is expressed in the fact that the gel content of the mixture is clearly above the gel content of the starting components. The gel content of the partly cross-linked polymer mixtures (determined by heating for ½ hour in boiling chlorobenzene) is from 5 to 95% by weight. Partly cross-linked mixtures containing from 20 to 70% by weight of gel are particularly preferred.

The polyamide moulding compositions of the present invention may be produced in conventional mixing units, such as rollers, kneaders and single and multiple shaft extruders. Double shaft extruders are particularly suitable.

The moulding compositions may be produced in the mixing units mentioned by melting down together and homogenising the two components I and II, or by working product II into the melt of polyamide I.

The moulding compositions of the present invention may contain conventional additives, such as lubricants and mould-release agents, nucleation agents, stabilisers, flameproofing agents and dyes.

Moreover, the moulding compositions according to the present invention may contain reinforcing materials. In this case, a surprisingly great improvement in the impact and notched impact strength is observed, in particular when there is multi-axial impact stress. The moulding compositions thus reinforced usually contain from 10 to 60% by weight, preferably from 15 to 50% by weight, and more preferably from 20 to 40% by weight of reinforcing agents, in particular glass fibres, based on the total moulding composition.

Instead of glass fibres or combined therewith, the moulding compositions of the invention may also contain other fillers or reinforcing materials, for example glass beads, asbestos, talcum, kaolin, wollastonite, microvit, mica, chalk, quartz or calcinated aluminum silicates.

The present moulding compositions are distinguished by an extremely high notched impact strength, particularly in the cold, and by a high alternate bending resistance. The compositions are thus particularly suitable for the production of heavily stressed parts in the motor vehicle sector, for example for the production of bumpers and body parts.

EXAMPLES

Composition of the ethylene (graft) copolymers (Table 1)

Table 1 shows the ethylene (graft) copolymers which are used in the Examples. Product a is an ethylene copolymer, while products b–g are ethylene graft copolymers which contain as the graft substrate Baylon 19N430® (high pressure polyethylene produced by Bayer AG) and contain as monomer acrylic acid and/or (meth)acrylates. The product h contains as the graft substrate an ethylene/vinyl acetate copolymer, on which t-butyl acrylate is grafted.

TABLE 1

| Denotation | Composition of the ethylene (graft) copolymers | | | |
|---|---|---|---|---|
| | Type | Composition Graft base | Graft monomers | Gel proportion[3] % |
| a | Copolymer[1] | — | — | 17.2 |
| b | Graft copolymer | 92% Baylon ® 19N430[2] | 4.0% n-BA 4.0% t-BA | 9.2 |
| c | Graft copoylmer | 96.4% Baylon ® 19N430[2] | 3.6% t-BA | 4.0 |
| d | Graft copolymer | 90.0% Baylon ® 19N430[2] | 9% n-BA 1% AS | 12.0 |
| e | Graft | 88% | 8% | 8.0 |

TABLE 1-continued

| Denotation | Type | Composition Graft base | Graft monomers | Gel proportion[3] % |
|---|---|---|---|---|
| | copolymer | Baylon ® 19N430[2] | n-BA 4% t-BA | |
| f | Graft copolymer | 93% Baylon ® 19N430[2] | 6% n-BA 1% t-BA | 10.2 |
| g | Graft copolymer | 93% Baylon ® 19N430[2] | 4% n-BA 3% MMA | 7.3 |
| h | Graft copolymer | 96% Baylon ® 10M460[4] | 4% t-BA | 6.1 |

[1] = ethylene copolymer containing 4% by weight of acrylic acid and 7% by weight of n-butyl acrylate
[2] High pressure polyethylene produced by Bayer AG
[3] Determined by heating for ½ hour in boiling chlorobenzene
[4] Copolymer of ethylene and 8% by weight of vinyl acetate
n-BA = n-butyl acrylate
t-BA = t-butyl acrylate
AS = acrylic acid
MMA = methyl methacrylate The graft copolymers b to g are produced by the process described in German Offenlegungsschrift No. 2,801,585.

Production of the partly cross-linked polymer mixtures of ethylene (graft) copolymers and polybutadiene rubbers (Table 2)

The partly cross-linked polymer mixtures A to P in Table 2 were produced in a 1 liter internal kneader manufactured by Werner & Pfleiderer, by introducing the calculated quantity of ethylene (graft) copolymer into the kneader together with the polybutadiene rubber which had been crushed. The temperature in the kneader was adjusted to 130° C. Kneading was carried out for about 7 minutes, and the course of kneading was followed by an energy consumption recorder. During this process, the mass temperature was from 150° to 230° C., depending on the composition of the mixture. The kneaded product was deposited on a roller heated to 100° C. and was drawn out into a sheet. The sheet was cut into pieces of 5 cm and was then granulated.

The gel proportion was determined from the granulated material by heating 2 g of substance for ½ hour in boiling chlorobenzene. The solution was then cooled and filtered. The insoluble proportion corresponds to the proportion of gel.

Production of the polyamide moulding compositions (Table 3)

The partly cross-linked polymer mixtures A to P were worked into the polyamide in a standard continuously operating double shaft extruder ZSK 32 manufactured by Werner & Pfleiderer by mixing the polyamide and the polymer mixtures and then metering them together into the extruder. Blanketing with nitrogen is appropriate. The partly cross-linked polymer mixture of ethylene (graft) copolymer and rubber was melted down and homogeneously distributed in the polyamide. It may be advantageous to degas the melt before issuing out of the nozzle. The cylinder temperatures were adjusted such that a mass temperature of from 280° to 290° C. was ensured. The melt strand of the mixture of polyamide and graft product was cooled in water, granulated and dried. Standard small rods (according to DIN 53 453) and flat rods (according to DIN 53 453) were injected from the granulated material on a conventional injection moulding machine at 260° C.

The following tests were carried out on the standard small rods: the notched impact strength at room temperature and at −40° C. according to DIN 53 453, and the flexural resistance according to DIN 53 452, and the flat rods were tested for alternate bending resistance (similar according to DIN 53 359).

The composition and the properties of the moulding compositions are provided in Table 3.

The reinforced moulding compositions were produced by working glass fibres in the form of cut glass fibre strands into the melt, consisting of polyamide and partly cross-linked polymer mixture, so that the mixture extruded from the nozzle in strand form contained about 30% by weight of glass fibres. The strands were cooled in a water bath, granulated and dried. The granulated material was processed into test bodies on an injection moulding machine. The injection mouldings were tested in a freshly injected, dry condition.

In order to assess the mechanical properties, the impact resistance and notched impact strength (according to DN 53 453), the damage work according to a multi-axial impact test (according to DIN 53 443) and the flexural resistance (according to DIN 53 452) were determined. The composition and properties of the reinforced polyamide moulding compositions are provided in Table 4.

TABLE 2

Composition of the partly cross-linked polymer mixtures of polybutadiene rubbers and polyethylene copolymers

| | Polybutadiene rubber/parts | | Polyethylene copolymer | | Gel proportion[1] % |
|---|---|---|---|---|---|
| Type | Diene NF 45 ®[2] parts by weight | Buna CBlp ®[3] parts by weight | parts by weight | type | |
| A[4] | 66 | — | 34 | Baylon ® 19 N430 | 54 |
| B[4] | — | 66 | 34 | Baylon ® 19 N430 | 51 |
| C | 66 | — | 34 | b | 57 |
| D | — | 60 | 40 | c | 53 |
| E | — | 60 | 40 | e | 56 |
| F | — | 60 | 40 | f | 58 |
| G | — | 60 | 40 | a | 55 |
| H | 70 | — | 30 | d | 62 |
| I | 60 | — | 40 | c | 58 |
| J | 60 | — | 40 | e | 57 |
| K | 60 | — | 40 | f | 58 |
| L | — | 80 | 20 | e | 41 |
| M | — | 70 | 30 | e | 45 |
| N | — | 50 | 50 | e | 58 |
| O | — | 30 | 70 | e | 69 |
| P | 50 | — | 50 | h | 63 |

[1] Determined by heating for ½ hour in boiling chlorobenzene
[2] Polybutadiene rubber (1,2 proportion about 1.2%) produced by Firestone
[3] Polybutadiene rubber (1,2 portion about 1%) produced by Bayer AG
[4] Comparative products

TABLE 3

Composition and properties of the polyamide moulding compositions

| Example | Type | Polyamide $\eta$ rel[2] | % by weight | partly cross-linked polymer mixture from Type | Tab. 2 % by weight | Notched impact strength [kJ/m²] +25° C. | Notched impact strength [kJ/m²] −40° C. | Flexural resistance [MPa] | Alternate bending resistance[3] |
|---|---|---|---|---|---|---|---|---|---|
| 1[1] | PA-6 | 3.96 | 70 | A | 30 | 16.5 | 2.1 | 58 | 7000 |
| 2[1] | PA-6 | 3.96 | 70 | B | 30 | 17.3 | 3.0 | 55 | 8500 |
| 3[1] | PA-6 | 3.96 | 80 | A | 20 | 15.6 | 2.4 | 67 | 6300 |
| 4[1] | PA-6 | 3.96 | 80 | B | 20 | 14.7 | 2.0 | 65 | 3600 |
| 5[1] | PA-6,6 | 3.04 | 70 | A | 30 | 6.7 | — | 64 | 1000 |
| 6 | PA-6 | 3.96 | 70 | G | 30 | 39.3 | 9.6 | 55 | 27000 |
| 7 | PA-6 | 3.96 | 80 | H | 20 | 46 | 12.4 | 66 | 22000 |
| 8 | PA-6 | 3.96 | 70 | C | 30 | 53.1 | 18.4 | 54 | 68000 |
| 9 | PA-6 | 3.96 | 70 | D | 30 | 49.4 | 16.2 | 53 | 71000 |
| 10 | PA-6 | 3.96 | 70 | E | 30 | 56.6 | 18.5 | 56 | 70500 |
| 11 | PA-6 | 3.96 | 70 | F | 30 | 54.7 | 19.6 | 57 | 67000 |
| 12 | PA-6 | 3.96 | 80 | I | 20 | 35.4 | 8.2 | 69.5 | 19000 |
| 13 | PA-6 | 3.96 | 80 | J | 20 | 55.6 | 17.4 | 71 | 36000 |
| 14 | PA-6 | 3.96 | 80 | K | 20 | 32.2 | 7.5 | 67 | 18000 |
| 15 | PA-6 | 3.96 | 70 | L | 30 | 34.7 | 8.4 | 52 | 27000 |
| 16 | PA-6 | 3.96 | 70 | M | 30 | 57.0 | 19.4 | 57 | 69000 |
| 17 | PA-6 | 3.96 | 70 | N | 30 | 57.1 | 20.2 | 61 | 66000 |
| 18 | PA-6 | 3.96 | 70 | O | 30 | 46.2 | 15.3 | 66 | 56000 |
| 19 | PA-6 | 3.96 | 80 | P | 20 | 62.2 | 16.4 | 65 | 19500 |
| 20 | PA-6 | 3.96 | 60 | I | 40 | 41.2 | 28.5 | 35 | 89000 |
| 21 | PA-6 | 3.96 | 60 | J | 40 | 32.1 | 24.0 | 25.2 | 100000 |
| 22 | PA-6,6 | 3.06 | 80 | J | 20 | 34.5 | 7.2 | 76 | 12000 |
| 23 | PA-6,6 | 3.06 | 70 | J | 30 | 46.3 | 9.7 | 65 | 22000 |

[1]Comparative Example
[2]Measured in m-cresol at 23° C. in an Ubbelohde viscosimeter
[3]= number of strokes until broken

TABLE 4

Composition and properties of the reinforced polyamide moulding compositions

| Example | Type | Polyamide $\eta$ rel[2] | % by weight | partly cross-linked polymer mixture from Type | Tab 2 % by weight | Impact strength [kJ/m²] | Notched impact strength [kJ/m²] | Damage work [N.m.] | Flexural resistance [Mpa] |
|---|---|---|---|---|---|---|---|---|---|
| 24 | PA-6 | 3.10 | 67 | J | 3 | 55.4 | 13.2 | 2.1 | 219 |
| 25 | PA-6 | 3.10 | 65 | J | 5 | 56.2 | 14.9 | 3.4 | 225 |
| 26 | PA-6 | 3.10 | 60 | J | 10 | 61.8 | 17.2 | 7.9 | 217 |
| 27 | PA-6 | 3.10 | 65 | N | 5 | 55.2 | 15.1 | 4.2 | 223 |

We claim:

1. A thermoplastic moulding composition comprising
   I. from 35 to 99% by weight of a polyamide, and
   II. from 65 to 1% by weight of a partly cross-linked polymer mixture containing a gel proportion of from 5 to 95% by weight and consisting of:
   (a) from 5 to 80% by weight of (a1) a copolymer of ethylene with (meth)acrylic acid and/or with a (meth)acrylate containing a $C_1$-$C_8$ alcohol residue (a2) a graft product of polyethylene or an ethylene/vinyl acetate copolymer as the graft substrate and (meth)acrylic acid and/or a (meth)acrylate containing a $C_1$-$C_8$ alcohol residue as the grafted-on monomers or mixtures of (a1) and (a2) and
   (b) from 95 to 20% by weight of a polybutadiene rubber having a Mooney viscosity $ML_{1+4}$ (100) of from 5 to 100 and having a gel proportion of less than 2% by weight, determined in boiling chlorobenzene,
   III. optionally conventional additives, and
   IV. optionally from 10 to 60% by weight, based on the total moulding composition, of fillers of reinforcing materials or mixtures thereof,
   the total of I and III and of (a) and (b) being 100% by weight in each case.

2. A thermoplastic moulding composition as claimed in claim 1 comprising from 45 to 97% by weight of the component I and from 55 to 3% by weight of the component II.

3. A thermoplastic moulding composition as claimed in claim 1, wherein the ethylene copolymer or the polyethylene graft product contains from 1 to 60 mol % of copolymerised or grafted-on monomers.

4. A thermoplastic moulding composition as claimed in claim 1, containing from 20 to 70% by weight of the component (a) and from 80 to 30% by weight of the component (b).

5. A thermoplastic moulding composition as claimed in claim 1 wherein the polybutadiene rubber has a Mooney viscosity $ML_{1+4}$ (100) of from 20 to 60.

6. A thermoplastic moulding composition as claimed in claim 3 wherein component a contains from 3 to 25 mol % of copolymerized or grafted on monomers.

7. A thermoplastic moulding composition as claimed in claim 1, wherein the (meth)acrylates of component(a) contain a $C_1$-$C_4$ alcohol residue.

8. A thermoplastic moulding composition as claimed in claim 7, wherein the alcohol residue is derived from n- or t-butyl alcohol or mixtures thereof or of methyl alcohol or mixtures thereof.

9. Mouldings produced from a thermoplastic moulding composition as claimed in claim 1.

* * * * *